US006205486B1

United States Patent
Wei et al.

(10) Patent No.: US 6,205,486 B1
(45) Date of Patent: Mar. 20, 2001

(54) INTER-NETWORK BRIDGE CONNECTOR PROVIDED FOR DYNAMICALLY PRIORITIZING FRAME TRANSMISSION ADAPTIVE TO CURRENT NETWORK TRANSMISSION-STATE

(75) Inventors: Edward Wei; Gary C. Huang, both of Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 08/690,369

(22) Filed: Jul. 26, 1996

(51) Int. Cl.$^7$ .......................... G06F 15/173; H04L 12/20
(52) U.S. Cl. .......................... 709/233; 709/234; 709/236; 709/249; 370/414
(58) Field of Search .................. 395/200.63, 200.69, 395/200.65, 200.66, 200.67, 728, 732, 800.29, 800.3, 876; 709/236, 249, 233, 234; 370/412, 413, 414

(56) References Cited

U.S. PATENT DOCUMENTS

| | | | |
|---|---|---|---|
| 4,358,829 | * 11/1982 | Branigin et al. ...................... | 709/103 |
| 5,046,039 | * 9/1991 | Ugajin et al. ......................... | 395/876 |
| 5,274,642 | * 12/1993 | Widjaja et al. ....................... | 370/411 |
| 5,541,922 | * 7/1996 | Pyhalammi ........................... | 370/462 |
| 5,546,543 | * 8/1996 | Yang et al. ...................... | 395/200.65 |
| 5,623,603 | * 4/1997 | Jiang et al. ..................... | 395/200.37 |
| 5,655,140 | * 8/1997 | Haddock .......................... | 395/200.76 |
| 5,757,799 | * 5/1998 | LaRue .................................. | 370/423 |
| 5,802,310 | * 9/1998 | Rajaraman ..................... | 395/200.64 |

OTHER PUBLICATIONS

Tanenbaum, A., Computer Networks, Prentice–Hall, pp. 215–225, 1981.*

* cited by examiner

Primary Examiner—Dung C. Dinh
(74) Attorney, Agent, or Firm—Nath & Associates; Harold L. Novick

(57) ABSTRACT

The present invention discloses a dynamically-adaptive connector-bridge for receiving data frames from a source-network and transmitting the data frame to a destination-network including a plurality of host-computers for receiving the data frames. The connector-bridge includes a data-frame converter for converting the data frames into corresponding destination-network-data-frames suitable for transmission in the destination network. The bridge-connector further includes a dynamic-dispatching means for receiving the destination-network-data-frames for determining a frame-type, a byte-length, and a set of destination-host-computers on the destination-network, and the dynamic-dispatching means employing the frame type, the byte-length, the set of destination-host computers, and a current-data-transmission-state of the destination-network to dynamically prioritize the destination-network-data-frames for dispatching each of the destination-network-data-frames to the set of destination-host-computers.

4 Claims, 5 Drawing Sheets

INTER-NETWORK BRIDGE CONNECTOR PROVIDED FOR DYNAMICALLY PRIORITIZING FRAME TRANSMISSION ADAPTIVE TO CURRENT NETWORK TRANSMISSION-STATE

BACKGROUND OF THE INVENTION

1. Field of the Invention

This invention relates generally to apparatus and method of network interface for data transmission. More particularly, this invention relates to an improved bridge-connector for an inter-network connection provided to dynamically prioritize data frame transfer such that transmission congestion in the network can be minimized.

2. Description of the Prior Art

Data transmission from a high speed network to a low speed network by the use of inter-network connecting devices, e.g., a bridge connector, often encounters the difficulties that transmission congestion may force a network time-out and cause even worse transmission congestion problems. This problem is caused by a conventional data transmission scheme which applies a first-in-first-out (FIFO) prioritization algorithm. This FIFO algorithm is most broadly employed in local area network (LAN), wide area network (WAN), or a connection between FDDI and Ethernet. In the network connections, the conventional FIFO transmission scheme transmits each of the output frames according to the sequence based on the order as these frames are received. When there are greater mismatches between the speeds of the high speed and low speed network, a frame congestion situation is often generated on the side of the low speed network. In the case when a buffer used to store the incoming frames temporarily is filled, the frames that arrive late have to be discarded. A time out for data transmission is often necessary when frames are discarded. Although the problem of a time out is resolved, more data are accumulated during the period when the network is out of service. Greater amount of data are to be transmitted as a result of the time out which often causes an even worse congestion.

FIGS. 1A and 1B are functional diagrams for illustrating the timing and sequencing of frame transmission over a bridge connector 10. In FIG. 1A, the solid black lines are used to represent transmission of data frames from host computer A in a high speed network 20 to host computer B in a low speed computer network 30. For the purpose of illustration, a line in the vertical direction represents the time sequence and the width in the horizontal direction represents bandwidth. A normal transmission of frames are shown FIG. 1A where three frames A1, A2, and A3 are transmitted from the high speed network 20 to the low speed network 30 via the bridge connector 10. The steeper slopes of A1, A2, and A3 on the right-hand side of the bridge connector 10 represent the fact that longer periods of time are required to transmit the frames on the low speed network 30. The periods T1 and T2 represent the time required to send a frame from host computer A to host computer B and to transmit acknowledge signal from computer B to computer A respectively. After the acknowledge signals are received back from the low speed network 30, more frames are transmitted from the high speed network 20 to the low speed network 30 as shown in FIG. 1A. This is a typical first-in-first-out (FIFO) transmission process carried out by the bridge connector 10.

A data transmission congestion is shown in FIG. 1B in which the high speed network 20 includes five host computers, computers A, B, C, D, and E, each transmitting data frames, e.g., A1, B1, C1, D1, E1, A2, A3, and A4, to the low speed network 30. A frame congestion is generated due to the transmission of five frames on the low speed network 30. Assume that a communication is carried out between host A in the HSN 20 and a host G in the LSN 30. Assume also that host-A and host-G use a sliding-windows based on a protocol with "go-back-N" type of error correction for data communication. With the window size of four, a maximum of three outstanding frames between host-A and host-G are allowed. As shown in FIG. 1B, the host-A is sending a series of frames A1, A2, A3, etc. to host-G. The first frame Al is sent without delay. Based on the first-in-first-out rule, transmission of A2, A3, and A4 has to wait for transmission of B1, C1, D1, and E1. As the host-G in the LSN sends the acknowledge signal back to HSN, the time allowed for sending A2 and A3 from host-A is over. The host-A then sends frame A4 instead. Re-transmission of frames A2 and A3 from host-A has to be performed later. In addition to the frames transmitted from host computer A, similar situation with frames generated by other computers B, C, D, and E may also occur thus causing further delay and congestion. Re-transmissions of many frames would be required which leads to further degradation of the network performance. When several hosts of the high speed network, e.g., hosts B, C, D, and E, are competing for a low speed data transmission channel, the FIFO priority management scheme applied by a conventional inter-network bridge for handling the timing and sequences of data transmission often causes uncertainties and delays due to the congestion problems. Wastes of precious bandwidth resources are caused by applying the first-in-first-out rule strictly and indiscretionarily.

Therefore, a need still exists in the art of computer network for data transmission to provide a new and improved method which can more effectively utilize the bandwidth of the low speed network to minimize data congestion thus preventing undesirable time-outs so that the difficulties encountered in the art can be resolved.

SUMMARY OF THE PRESENT INVENTION

It is therefore an object of the present invention to provide an improved frame transmission method implemented by the use of an inter-network bridge-connector so that the aforementioned difficulties and limitations in the prior art can be overcome.

Specifically, it is an object of the present invention to provide an improved bridge-connector including a host computer priority queue array wherein the priority of frame transmission is dynamically adjusted adaptive to the transmission state of a network so that the frame congestion can be reduced and the requirement of frame re-transmission can be minimized.

Another object of the present invention is to provide an improved bridge connector including multiple levels of queue arrays where the priority queues are readjusted periodically adaptive to the updated network transmission state so that the random competition of transmission time-windows on a network can be eliminated and priority of frame transmission can be properly arranged according to frame type, byte length and current transmission state of the host computers on the network.

Another object of the present invention is to provide an improved bridge connector wherein higher priority of data transmission are provided to the more frequent hosts in the low speed network during a period so that the data transmission for these hosts in the low speed network can be performed without having to wait for resolution of priority conflict under the rule of FIFO.

Briefly, in a preferred embodiment, the present invention includes a dynamically-adaptive connector-bridge for receiving data frames from a source-network and transmitting the data frame to a destination-network including a plurality of host-computers for receiving the data frames. The connector-bridge includes a data-frame converter for converting the data frames into corresponding destination-network-data-frames suitable for transmission in the destination network. The bridge-connector further includes a dynamic-dispatching means for receiving the destination-network-data-frames for determining a frame-type, a byte-length, and a set of destination-host-computers on the destination-network, and the dynamic-dispatching means employing the frame type, the byte-length, the set of destination-host computers, and a current-data-transmission-state of the destination-network to dynamically prioritize the destination-network-data-frames for dispatching each of the destination-network-data-frames to the set of destination-host-computers.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 6 is a timing sequence diagram showing the frame transmissions over the bridge connector of the present invention with reduced congestion and need for frame re-transmission.

DETAILED DESCRIPTION OF THE PREFERRED EMBODIMENT

Figure 2:
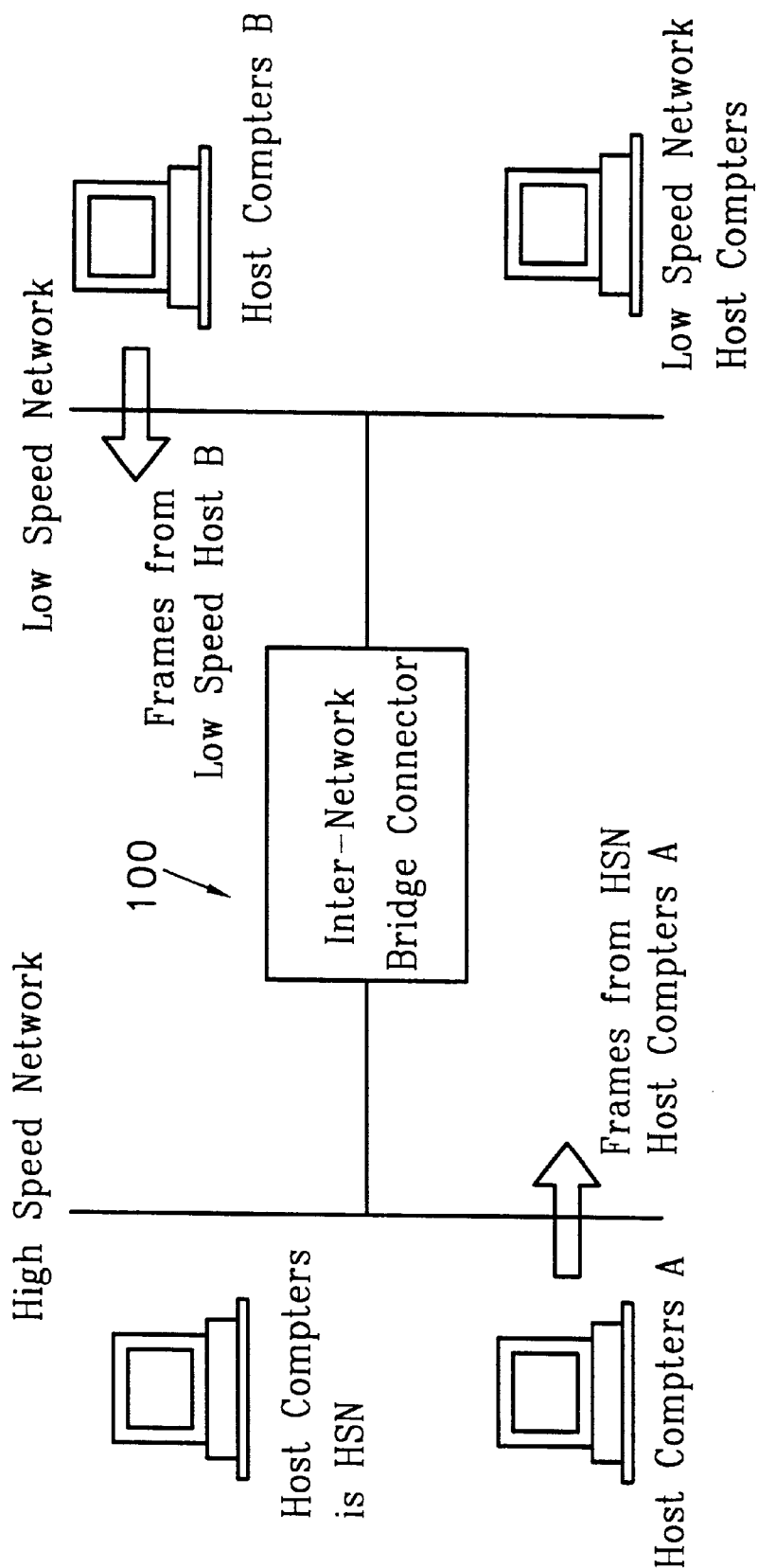
FIGS. 2 and 3 are functional block diagrams showing the system configuration of a bridge-connector of the present invention.

Please refer to FIG. 2 for an embodiment of the present invention which includes a network bridge device 100. The network bridge device 100 receives incoming frames from a processor node, e.g., a host computer A, of a high speed network. The network bridge device 100 processes the incoming frames from the high speed network (HSN) and send out frames to a processor node, e.g., a host computer B, included in a low speed network (LSN). Conversely, the network bridge device 100 is also provided to receive frames from the low speed network (LSN) computer B and transmit the frames to the high speed network (HSN) computer A.

Figure 3:
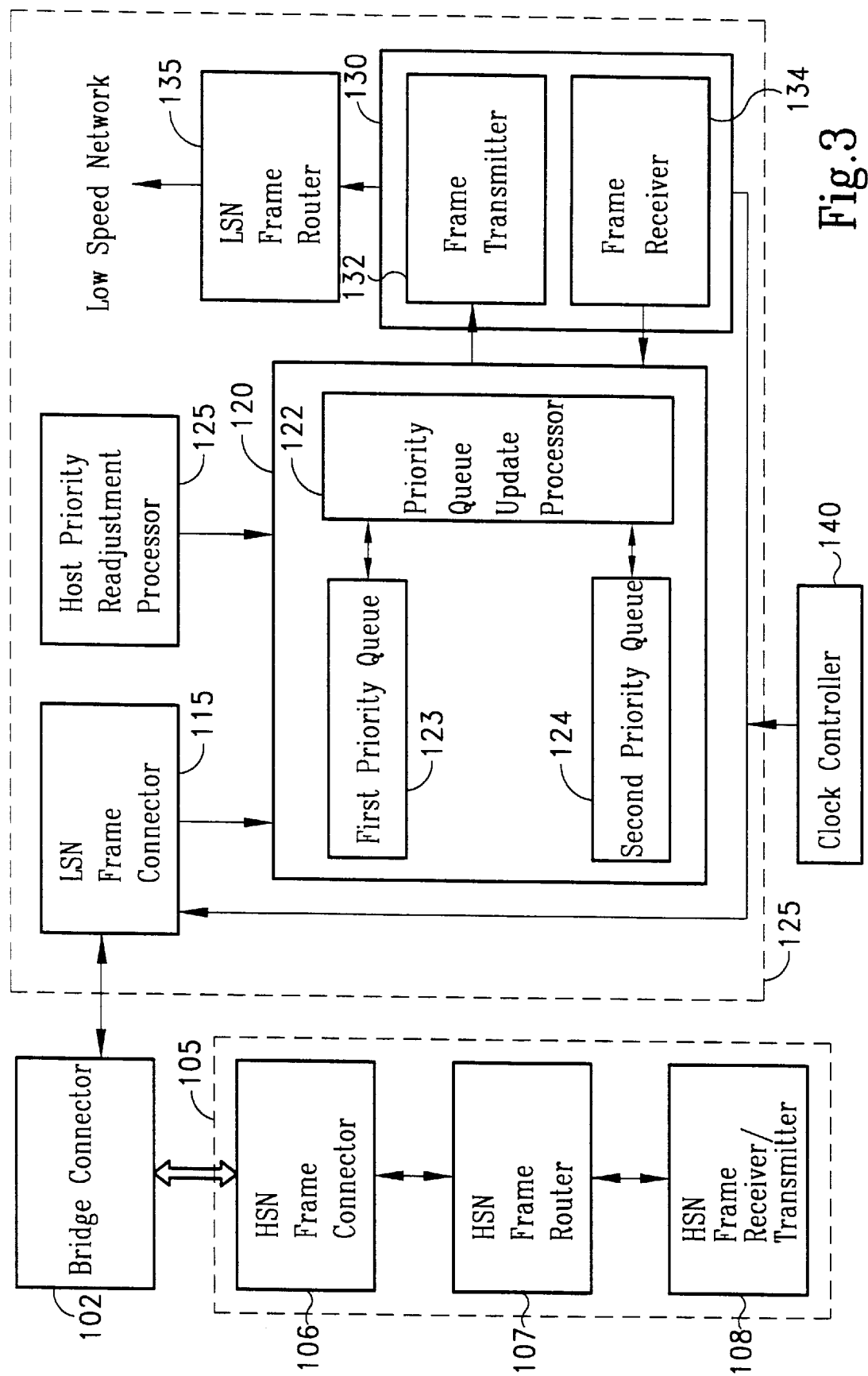

The functions and structure of the network bridge device 100 is described in further details in FIG. 3. The network bridge device 100 includes a high speed network interface block 105 for receiving a plurality of frames from a bridge connector 102 from a low speed network 110. The HSN interface block 105 includes a HSN frame converter 106 for converting the LSN frame into a HSN frame, a HSN router 107 for directing the distinctions of the HSN frames and a HSN transmitter/receiver 108 for transmitting and receiving frames to and from the high speed network (HSN).

Similar functional blocks are provided in the low speed network 110. The low speed network 110 includes a low speed network frame converter 115 for receiving a frame from the high speed network and for converting the received high speed network frame into a low speed network frame. The low speed network frame converter 115 further converts the destinations included in a high speed network frame to be corresponding to a low speed network distinctions for transmission to designated low speed network distinctions. The low speed network converter 115 performs a check to determine if the destination for a particular frame is already included in a host-table 120 for the low speed network 110. If the destination is already included in this host table 120, then the total number of bytes of the converted low speed network frame is increased by the total number of bytes recorded in the host-table 120 for the low speed network 110 and the time of finding the destination in the host-table 120 is recorded. On the other hand, if the destination of a particular frame is not already recorded in the host-table 120 for the low speed network, a record for this destination is established in the host-table 120 for the low speed network 110. The host-table 120 then checks if the destination of the received frame is a broadcast type frame. If it is, then the host-table updates the frame to increase the byte-number of the frame by the byte-number for a multi-cast type frame. If the frame is not a multi-cast type frame, then the frame is placed at the end of either a first priority array or a second priority array according to a rule further explained below. A time for these activities for the frame is also recorded. A host-priority readjustment processor 125 then rearranges the host table 120 for the low speed network 110 to update the priority sequences of the low speed network host computers. The host table 120 of the low speed network 110 then send a signal to inform a low speed frame router 130 which includes a frame transmitter 132 and a frame receiver 134 that the frame is ready to be further routed to the low speed network 110.

The host-table 120 for the low speed network 110 includes a memory to store data for information such as host media access control addresses, the total number of bytes for different frames, the total number of bytes for the multi-cast-type frames, the flags of the received frames for the low speed network, the level 1 priority queue array, and the level 2 priority queue array. The level 1 priority queue array 123 and the level 2 priority queue array 124 are updated by the host-priority readjustment processor 125 according the following rules:

(1) The host computers on the low speed network which have received frames are listed in the level 1 priority queue array.

(2) The rest of the host computers on the low speed network are listed in the level 2 priority queue array.

By applying these rules, the hosts in the low speed network which are identified to receive frames more frequently are placed at higher priorities. The hosts which are newly designated are initially placed at lower priority. The rule has the benefit to guarantee continuous data transmission to few most frequently designated hosts to which the tasks of data transmission are probably most urgent because of the frequency of transmission. The hosts which are new or only occasionally designated are placed at lower priorities. A host which is placed in level-1 will be "demoted" to level 2 when no messages are received for that host for a pre-determined length of time, e.g., 120 seconds. Data transmissions of frames to the lower priority hosts are temporarily stored in the data buffer while waiting for later transmission when the more urgent and continuous transmissions are completed.

The host priority readjustment processor 125 computes the total frame size in bytes for each frame transmitted from each host and the total frame size in bytes of a multi-casting frame. The priority queue array is then arranged according to a sequence based on the following sequence:

a) assigning the priority for a group of multi-cast frames which have total number of bytes less than a threshold value wherein the frame-priority sequence is assigned in reverse order based on the total number of bytes for each of multi-cast frames;

b) following the priority-sequence assigned in a), assigning a next set of priority-sequence for multi-cast or non-multi-cast frames in reverse order based on the total number of bytes of each frame;

c) following b), a last set of priority sequence is assigned to a set of hosts which may receive multi-cast frames or uni-cast frames. The priority order of these hosts are arranged according to an effective data size (EDS) where EDS is calculated as a sum for the number of bytes for all the multi-casting and uni-casting frames which is less than the sum for the number of bytes of all the multi-casting frames. When the EDS is calculated to be zero for a host, i.e., the host is receiving only the multi-casting frames, the EDS is assigned a value of infinite. The priority order is arranged in a reverse order of the size of EDS. A host with infinite EDS, i.e., receiving only multi-casting messages is arranged to have lowest priority. This priority arrangement is reasonable according to a common sense logic because an idle host will often receive no other messages except the broadcasting messages intended for every host in the network.

According to these priority rules, a data array containing the priority-sequence, set forth by the priority readjustment processor 125, is transmitted to the host table 120. The priority-sequence data array received by the host table 120 is then employed by a host priority queue update processor 122 to update a level 1 priority queue array 123 and a level 2 priority queue array 124 where the level 1 and level 2 queues are arranged according to the rules discussed above. The host table 120 also receives clock signals from a clock controller for recording a set-time whenever the host table 120 is updated and an individual frame-time when each frame is recorded in the priority queue arrays 123 or 124.

The low speed frame router 130 includes a low speed network frame transmitter 132 and a low speed network frame receiver 134. When a frame is received by the low speed network frame router 130 via the low speed network frame receiver 134, a check is made by comparing the received frame with the host table 120 to determine if an identical frame is recorded in the host table 120. If the frame is not found in the host table 120, then a record is established to record this frame in the host table 120. Otherwise, the original record of this frame included in the host table 120 is updated with a new time according to the newly received frame and the newly received frame is then ready to be retransmitted. Additionally, the frame receiver 134 transmits the received frame to the low speed network frame converter 115 to change the header of this frame to be recognized and applied by both the high and low speed networks. The LSN frame converter 115 then transmits the converted frame to the bridge connector 102 for transmitting to other networks. In the meantime, the frame transmitter 132 checks the host table 120 to determine if there are frames in the queue for transmission to the low speed network 110. If frames are found, the frames are sent to the low speed network 110 according to the order of the priority sequence in the host table 120 via a LSN frame router 135. Otherwise, the LSN frame router 135 is kept on a monitoring mode waiting for next frame to be added to the queue arrays in the host table 120.

Figure 4:
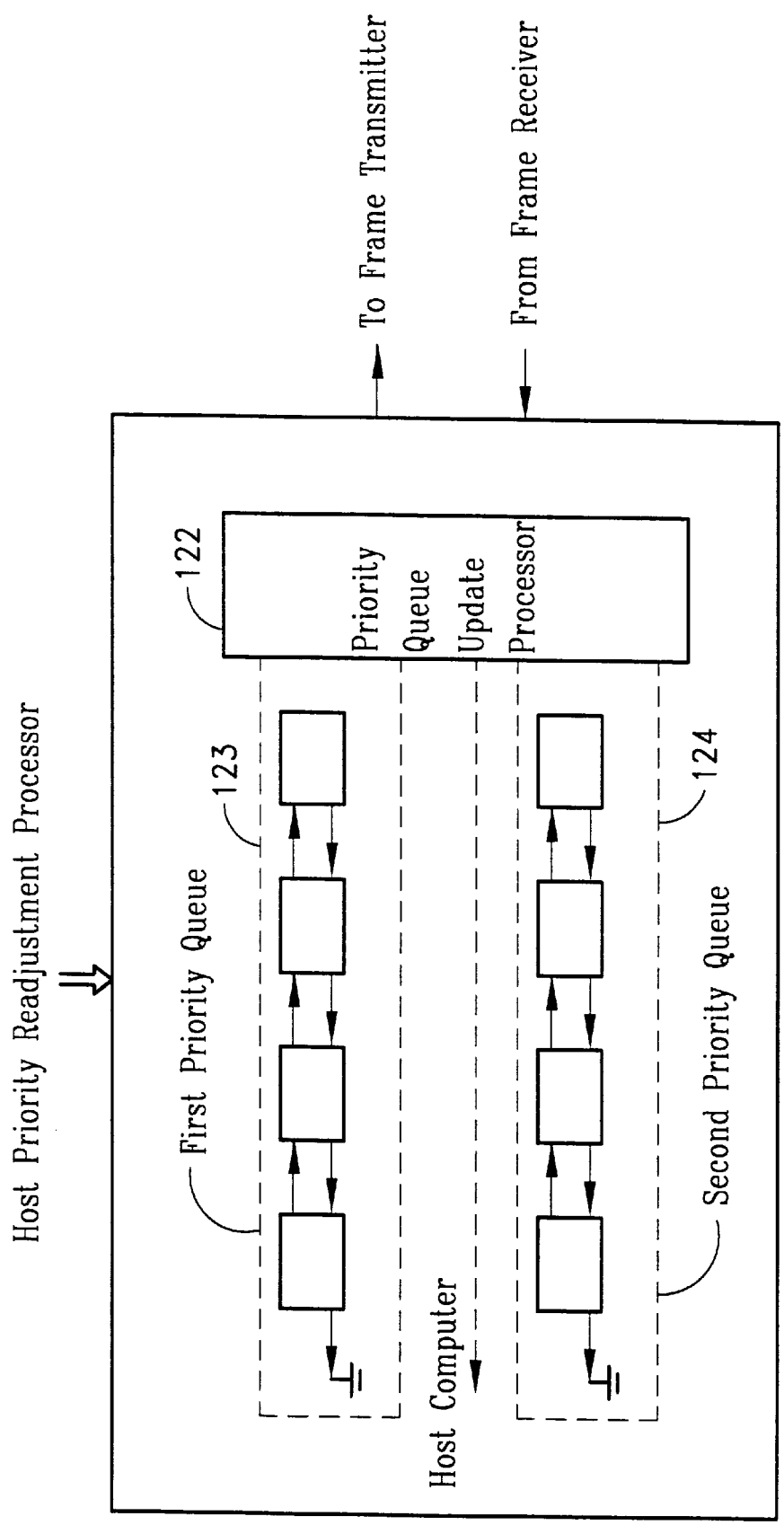
FIG. 4 is a processing diagram showing the update of the priority queue of the host computers included in the level 1 and level 2 priority queue arrays.

A functional block diagram is included in FIG. 4 to illustrate the arrangements and the sequence of data transfer according to the priority sequences in these arrays for the level 1 and level 2 priority-queue arrays 123 and 124 respectively. When data frames are ready for transmission, the host priority queue update processor 122 updates the host table to rearrange frames for transmission in a level 1 priority queue array 123 and a level 2 priority queue array 124.

The host priority readjustment processor 125 rearranges the priority sequence of frame queue arrays and eliminates frame queue which are not employed for longer than a predefined period of time. Typically, the time-period is approximately 120 millie-seconds According to the priority sequences listed in the first level and second level queue arrays 123, and 124 respectively, the frames are transmitted, one-by-one in the order of priority sequence, to the low speed network 110 via the low speed network frame transmitter 132. When the frame receiver 134 receives a frame, the header of the frame is changed by the low speed network frame converter 115. The destination address of the newly received frame is used to update the host table 120. The source address of the frame is also recorded in the frame queue. Meanwhile, the total number of bytes for the frame and the total number of bytes for multi-cast frames are updated.

Figure 5:
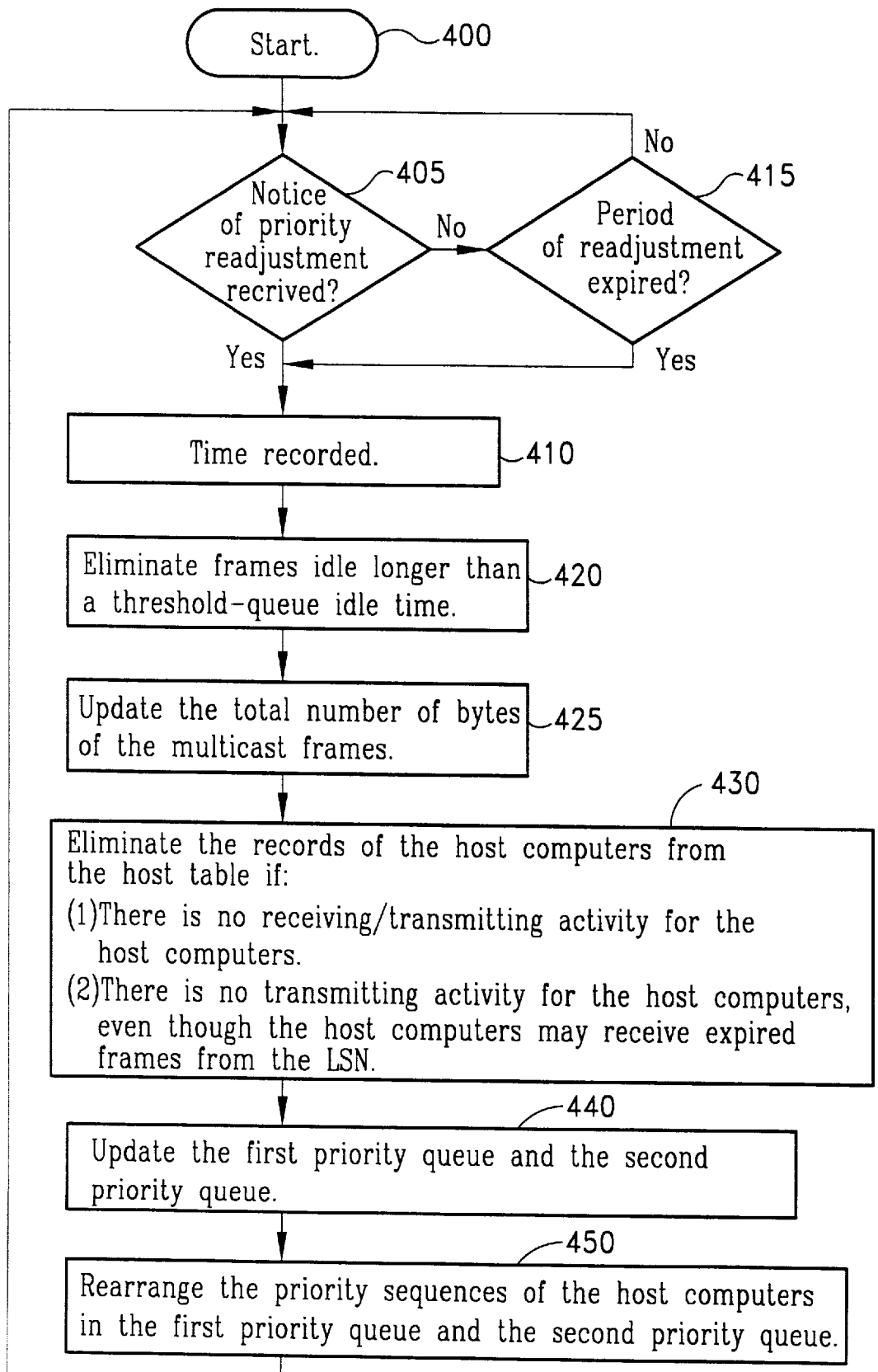
FIG. 5 is a flow chart showing the processing steps performed by the bridge-connector to dynamically arranging the priority of frame transmission adaptive to transmission state of the network to reduce frame congestion.

FIG. 5 is a flow chart to show the processing flow for changing the host table 120. The process begins (step 400) by making a determination of the reception of a notice to readjust the priority sequence of the host table 120 (step 405). If such a notice is received, a time of readjustment is recorded (step 410), otherwise, a check is made to determine if the time from last priority readjustment to now has exceeded a readjustment period (step 415), if it is, then again a current time is recorded (step 410). Otherwise, the process by continuing to wait for a notice of priority readjustment (step 405). The host table is updated by first eliminating the frames remained in the priority queue without activity for a time longer than a predefined threshold-queue-idle time (step 420). The total number of bytes for frames for the related host computers and the total number of bytes of the multi-cast frames are updated (step 425). The host table 120 is further updated by first eliminating the record for those host computers (step 430) wherein these host computers satisfy either of the following conditions: (1) there is no activity for the host computers in the newly received frame and there are no frames to be transmitted to this host computer; or (2) there is no activity for the host computers in the newly received frame and there are previous frames received by this host computer however the elapse time from last time when a frame is sent to this host computer has now exceeded a threshold elapse time. A priority sequence is then updated (step 440) by dividing the frames in the queue in two level of priorities. The frames received with destinations including host computers already included in the host table 120 are arranged in level 1 priority queue 123 and the remaining frames are placed in the level 2 priority queue 124. In the level 1 priority queue 123 and the level 2 priority queue 124, the frames are further prioritized (step 450) according to the rules that:

a) assigning the priority for a group multi-cast frames which have total number of bytes less than a threshold value and a frame-priority sequence is assigned in reverse order based on the total number of bytes for each of multi-cast frames;

b) following the priority-sequence assigned in a), assigning a next set of priority-sequence for multi-cast or non-multi-cast frames in reverse order based on the number of total bytes of each frame;

c) following b), a last set of priority sequence is assigned to a set of multi-cast frames with total number of bytes equal to the total number of bytes of a "data-frame".

Figure 1:
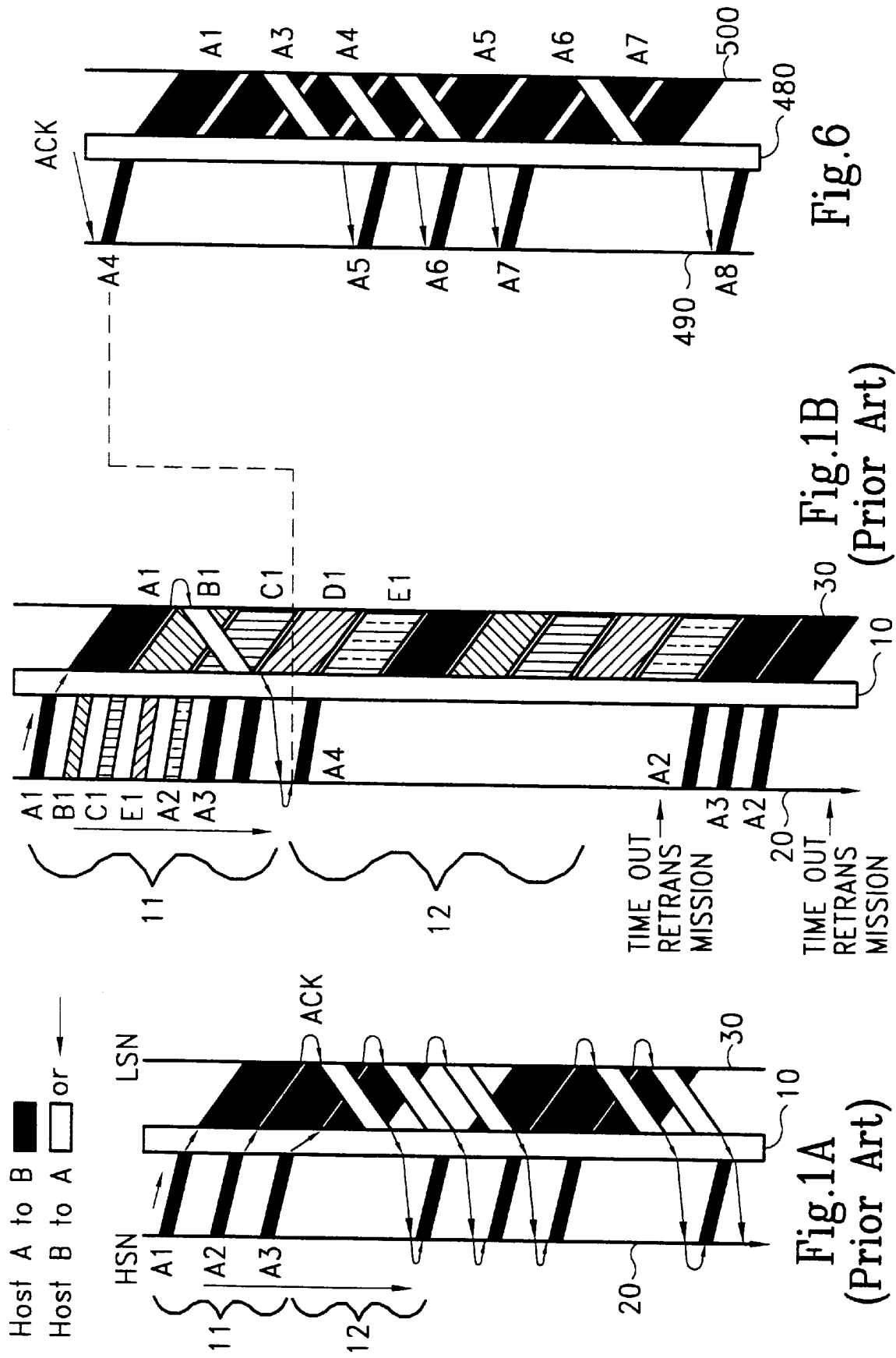
FIGS. 1A and 1B are functional diagrams for illustrating data frame transmissions applying a conventional inter-network bridge-connector.

FIG. 6 is functional flow diagrams to illustrate the data flow sequences over a bridge connector 480. The solid black line are used to represent data frames transmitted from host computer A in a high speed network 490 to host computer B in a low speed computer network 500. For the purpose of illustration, a line in the vertical direction represents the time sequence and the width in the horizontal direction represents bandwidth. Comparison can be made of the data transmission according to this invention as shown in FIG. 6 relative to that shown for FIG. 1B. Starting from the time when a data frame A4 is received, according to the rules of this invention, host A is listed as level 1 host because of host A is already recorded in the host table 120. Unlike the FIFO rule applied by the conventional bridge connector as that shown in FIG. 1B, frames A2, A3, A4 are first dispatched because these frames have higher priority. Following the transmission of a frame D1, frames A5, A6, and A7 are then transmitted in the low speed network 500, again, because these frames have higher priority even that these frames are received later than frames B1, C1, and E1. In contrast to the conventional scheme, host A, the most frequent user is well served while the remaining hosts are served on a bandwidth availability basis. Instead of keeping everyone waiting and wasting precious bandwidth resources as that occurred in FIG. 1B, priority is given to host A first to provide necessary service to the host with highest priority and to complete the task expeditiously and then reserve the rest of the time window to serve other hosts according to a well organized sequential order.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A transmission scheme of a bridge connector for transmitting frames between a high-speed network and a low-speed network, comprising the steps of:

converting each of incoming frames of a high speed network frame type into a low speed network frame type;

looking up a host table to determine if a destination of each of said incoming frames is recorded in a host table;

arranging a first priority queue by queuing each destination of said incoming frames found in said host table, and updating a frame length and a time of said destination of each of said incoming frames in said host table when said destination of each of said incoming frames is found in said host table;

arranging a second priority queue by queuing each destination of said incoming frames not found in said host table, and adding each destination of said incoming frames into said host table when each of said destination of said incoming frames is not found in said host table;

dynamically readjusting each of said destinations in said first priority queue and said second priority queue in response to a current transmission status of said low speed network; and transmitting each of said incoming frames according to a priority sequence determined by said priority queue and said second priority queue.

2. The transmission scheme of a bridge connector as claimed in claim 1, further comprising the steps of:

increasing the total number of bytes of each of said incoming frames by the total number of bytes recorded in said host table, and recording the search time for said destination of each of said incoming frames in said host table when each of said destinations of said incoming frames is found in said host table.

3. The transmission scheme of a bridge connector as claimed in claim 1, further comprising the steps of:

updating said host table by increasing the byte-number of each of said incoming frames by the byte-number for a multi-cast type frame when each of said incoming frames is a broadcast type frame; and appending each of said incoming frames to the end of said first priority queue or said second priority queue when each of said incoming frame is not a multi-cast type frame.

4. The transmission scheme of a bridge connector as claimed in claim 1, further comprising the steps of:

moving a destination in said first priority queue to said second priority queue when said destination having been idle for a predetermined period of time.

* * * * *